Nov. 6, 1928.  
J. W. MICHAELIS  
BRUSH MAKING MACHINE  
Filed Dec. 22, 1922  
1,690,420  
14 Sheets-Sheet 2
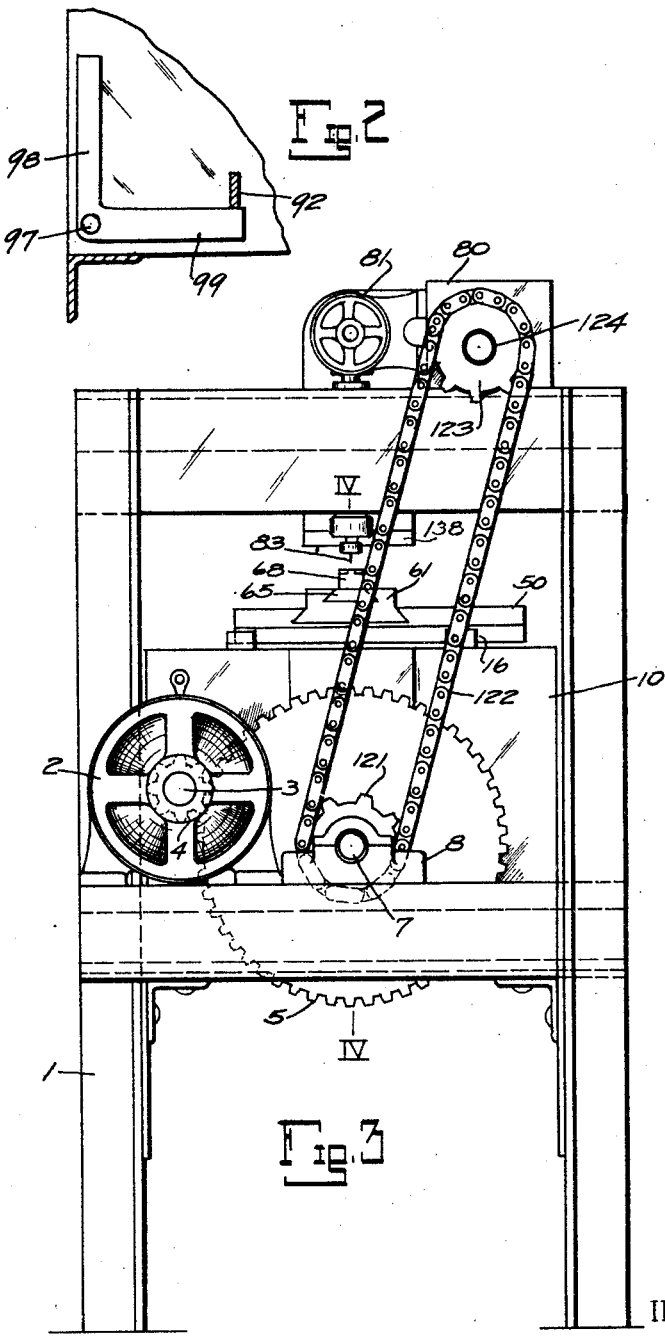
INVENTOR  
JOSEPH W. MICHAELIS  
BY  
HIS ATTORNEY

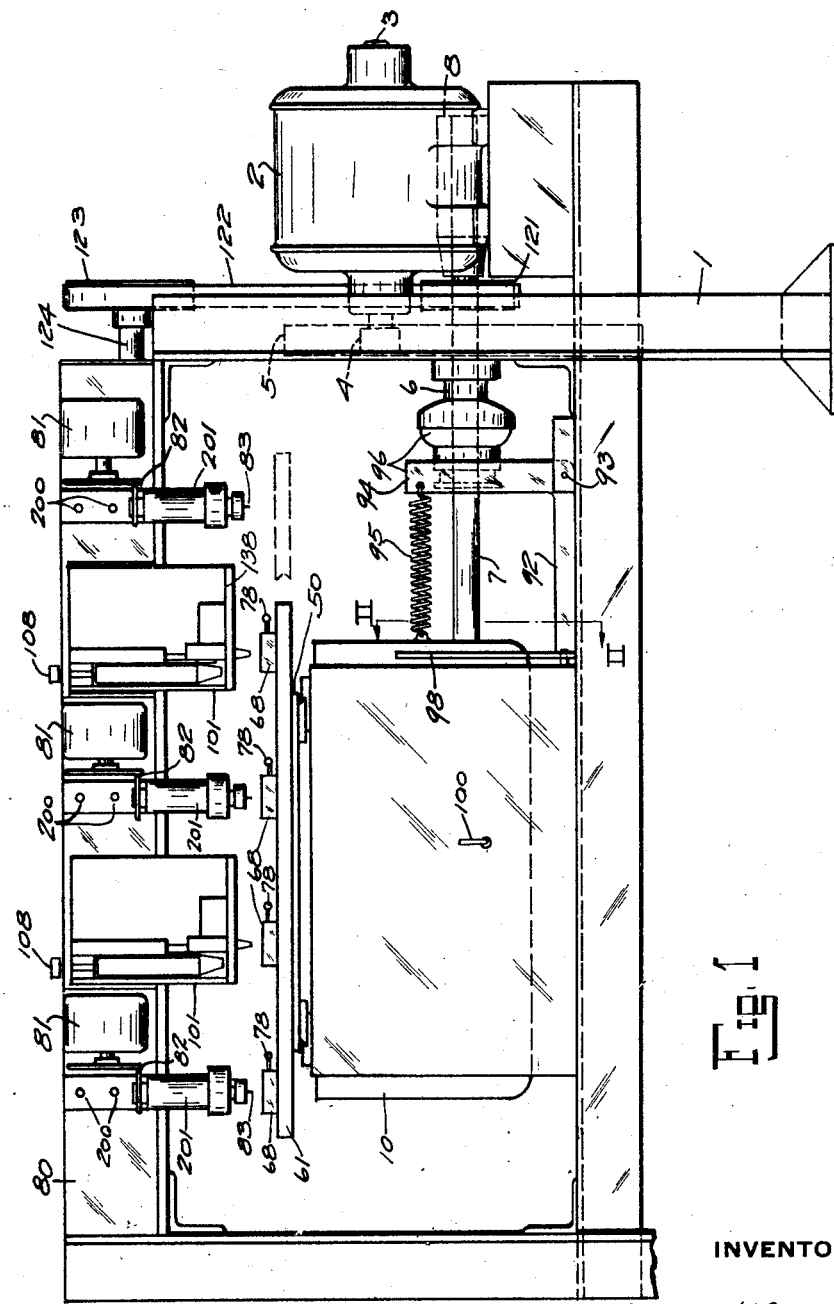

INVENTOR
JOSEPH W. MICHAELIS
BY
HIS ATTORNEY

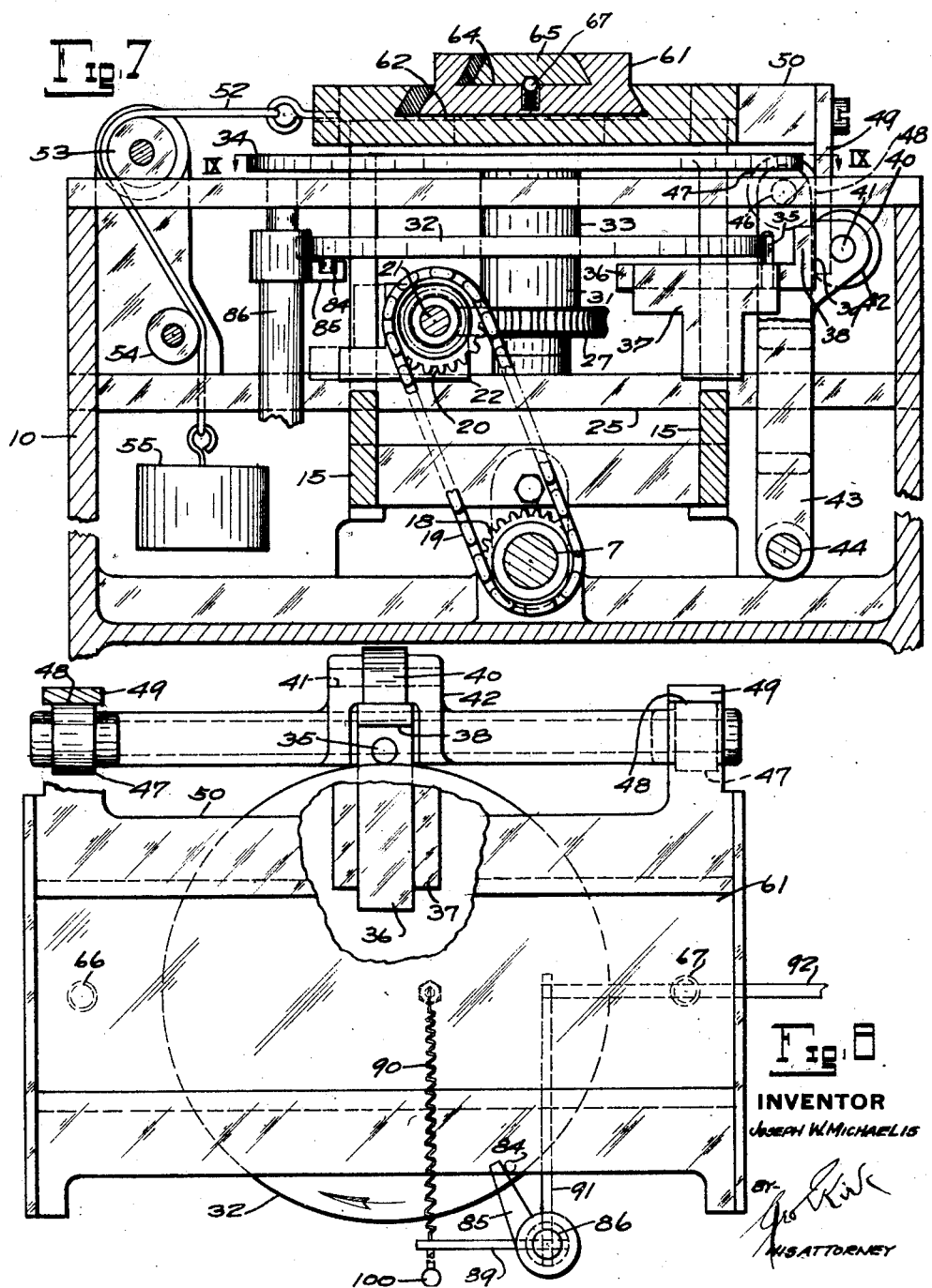

Nov. 6, 1928.

J. W. MICHAELIS 1,690,420

BRUSH MAKING MACHINE

Filed Dec. 22, 1922

INVENTOR

JOSEPH W. MICHAELIS

BY
HIS ATTORNEY

INVENTOR
JOSEPH W. MICHAELIS
BY
HIS ATTORNEY

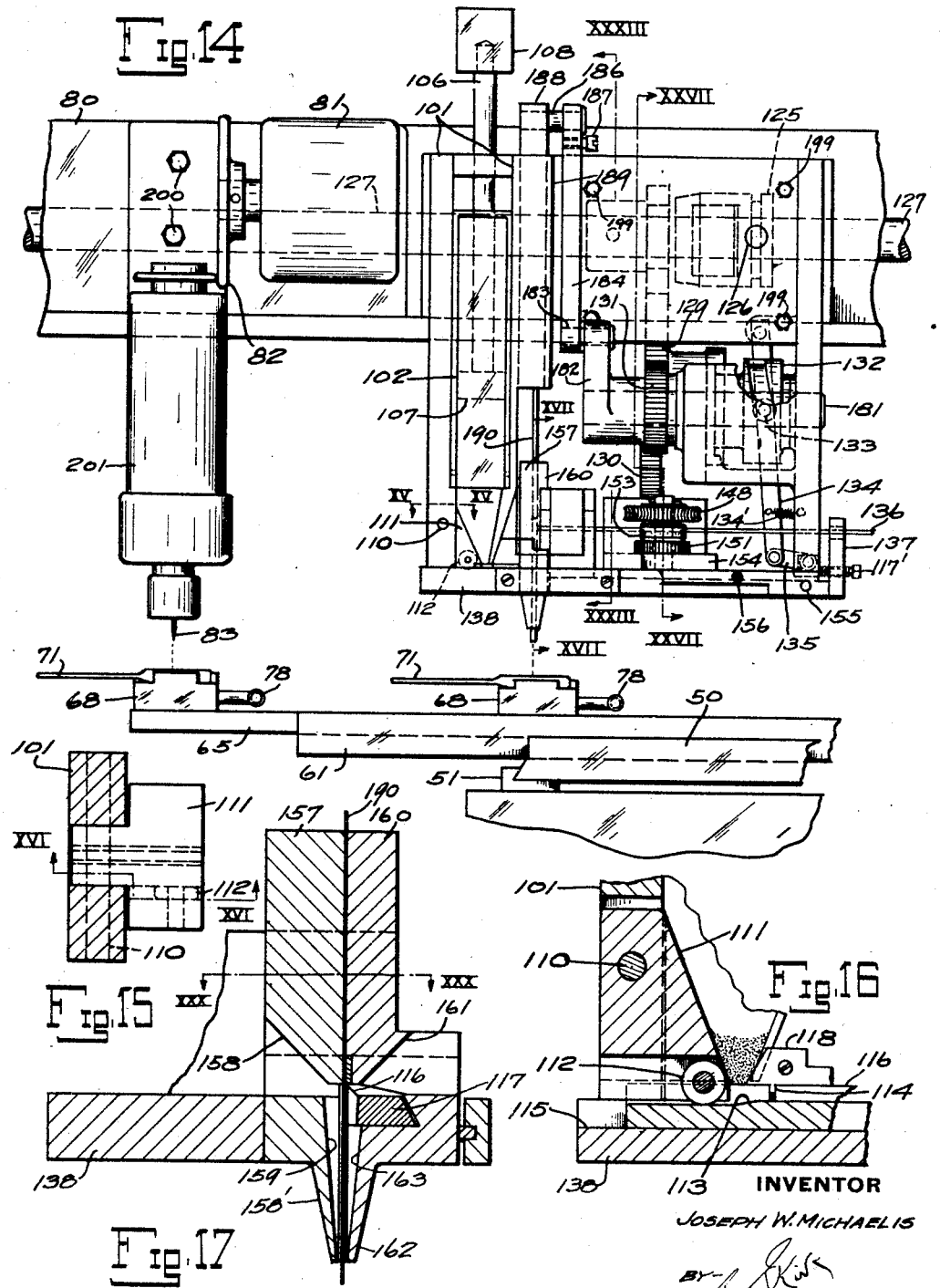

Nov. 6, 1928.
J. W. MICHAELIS
1,690,420
BRUSH MAKING MACHINE
Filed Dec. 22, 1922
14 Sheets-Sheet 8
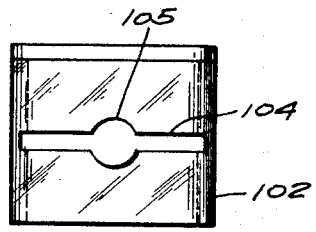
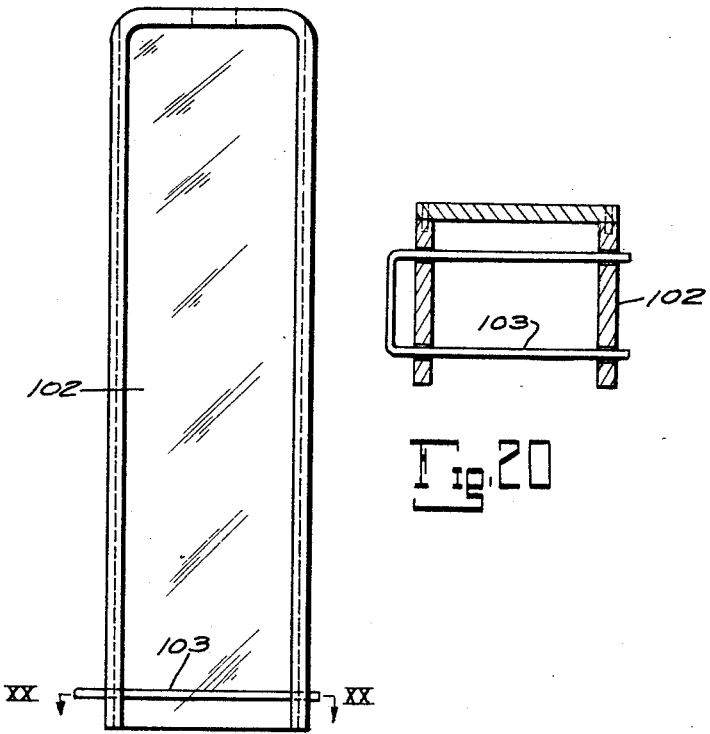
INVENTOR
JOSEPH W. MICHAELIS
BY
HIS ATTORNEY Nov. 6, 1928.
J. W. MICHAELIS
1,690,420
BRUSH MAKING MACHINE
Filed Dec. 22, 1922
14 Sheets-Sheet 9
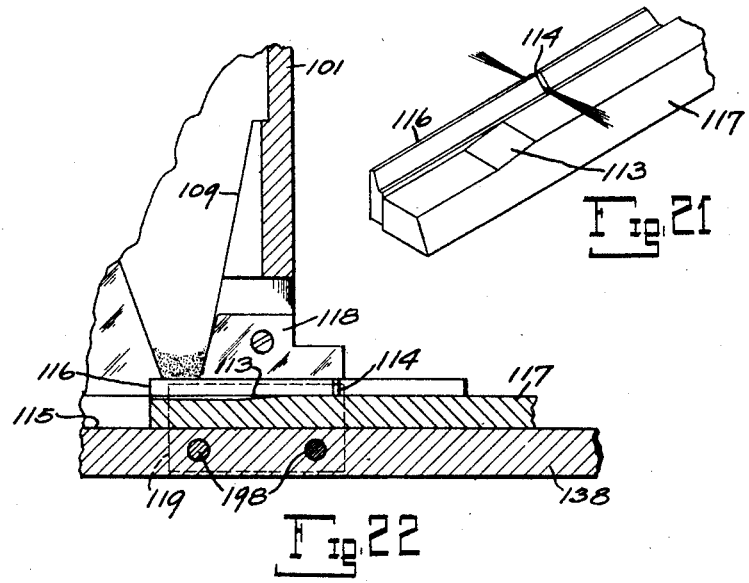
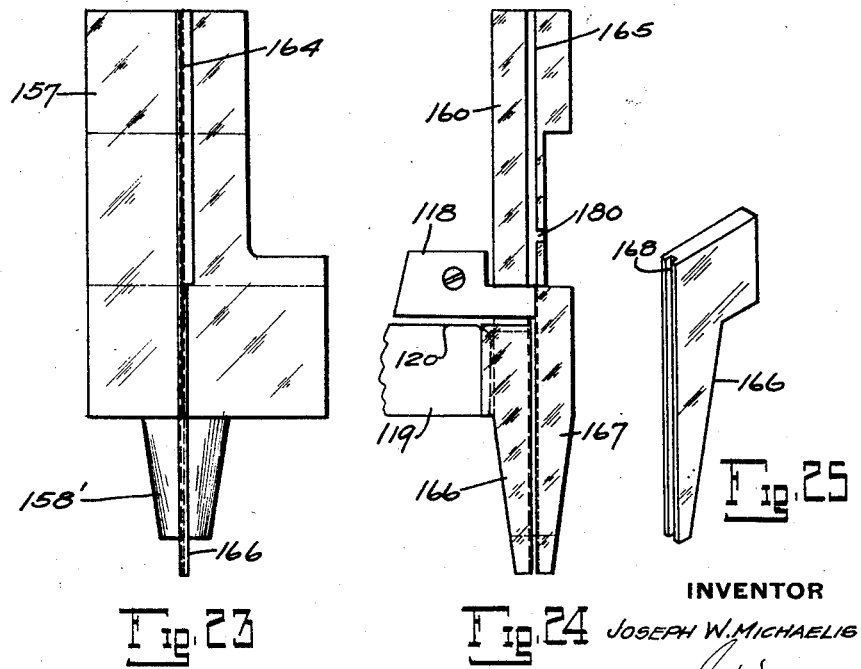
INVENTOR
JOSEPH W. MICHAELIS
BY
HIS ATTORNEY

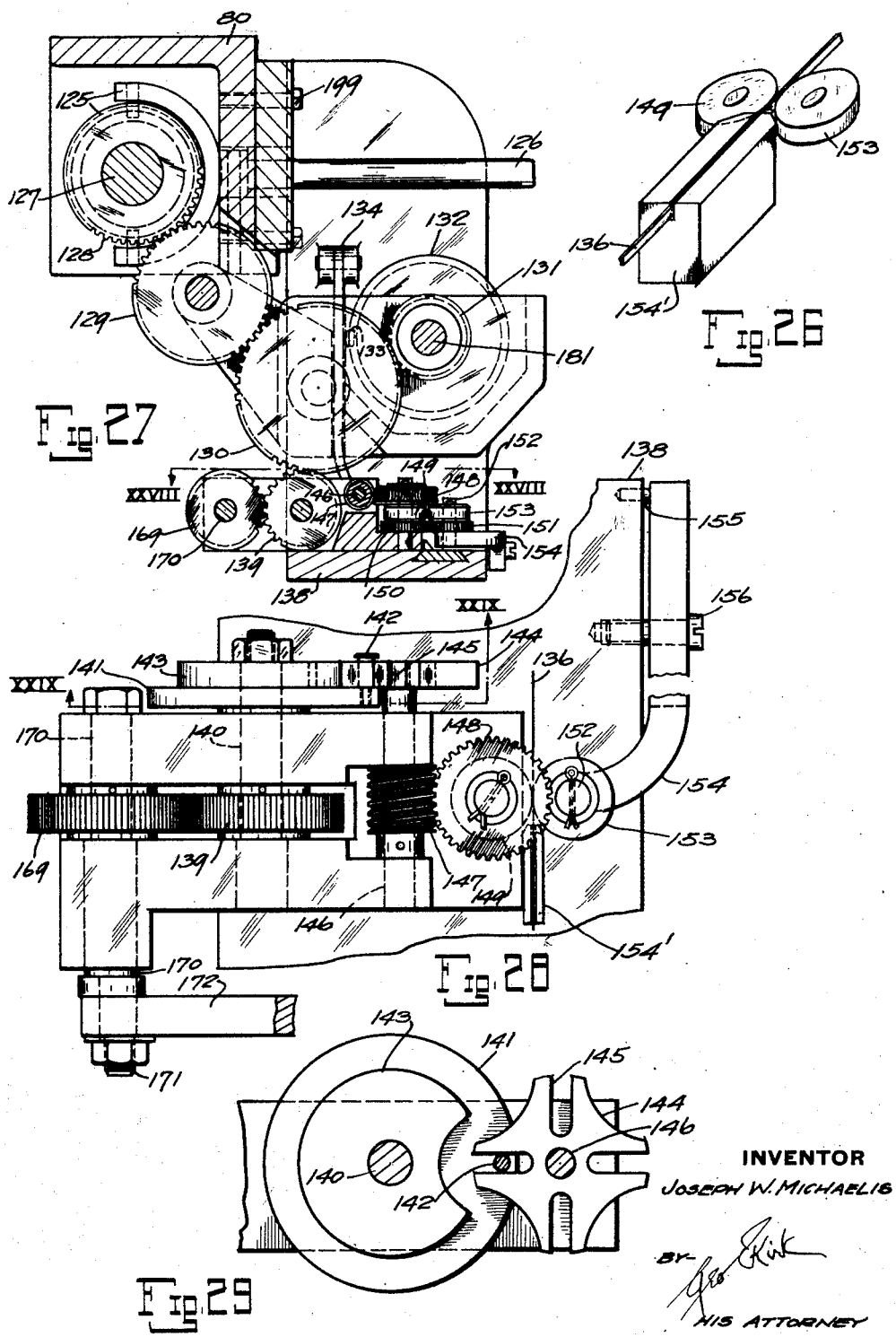

Nov. 6, 1928.

J. W. MICHAELIS 1,690,420

BRUSH MAKING MACHINE

Filed Dec. 22, 1922

INVENTOR
Joseph W. Michaelis

BY
HIS ATTORNEY

Nov. 6, 1928.
J. W. MICHAELIS
BRUSH MAKING MACHINE
Filed Dec. 22, 1922
1,690,420
14 Sheets-Sheet 12
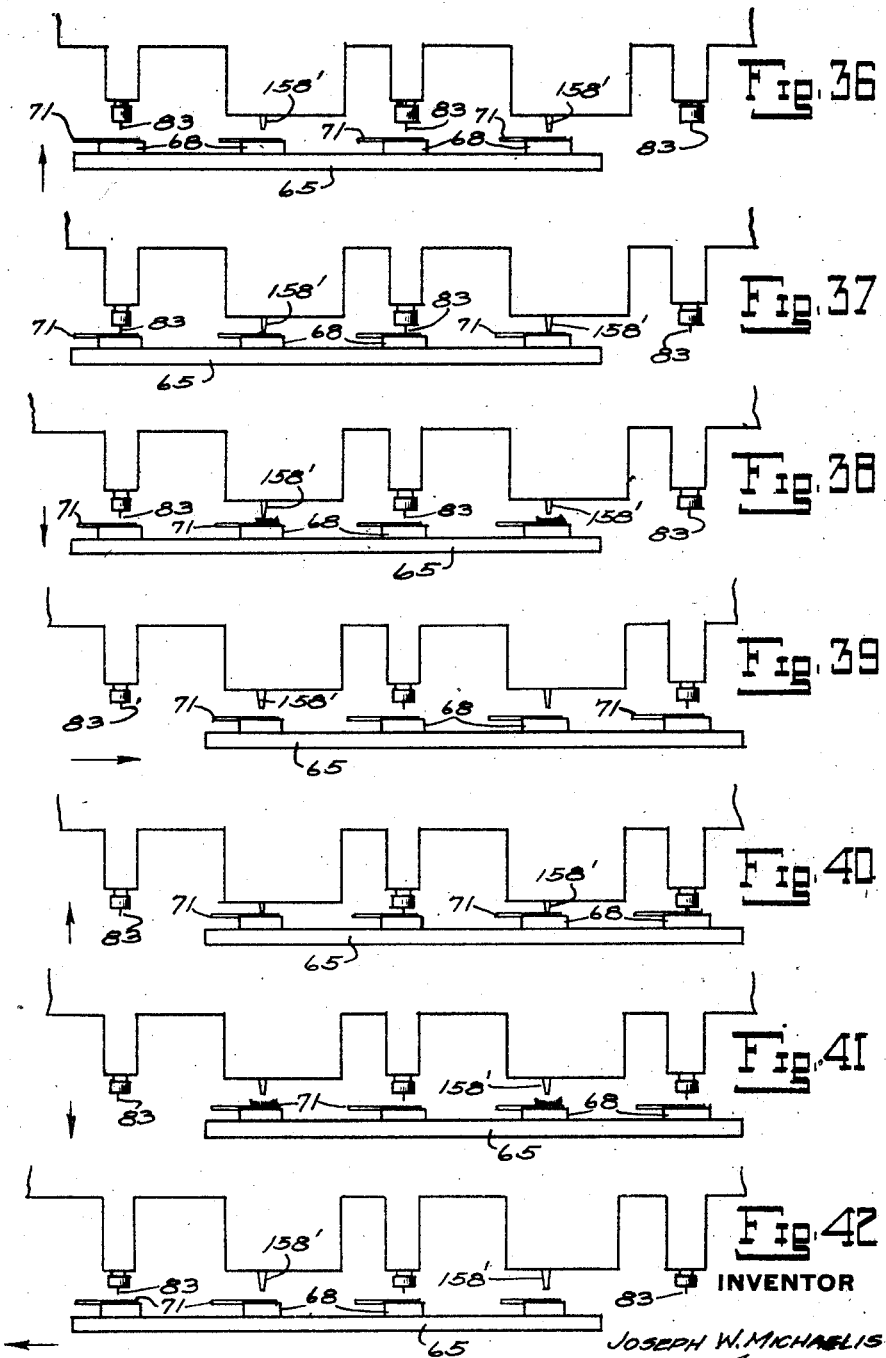
INVENTOR
JOSEPH W. MICHAELIS
BY
HIS ATTORNEY

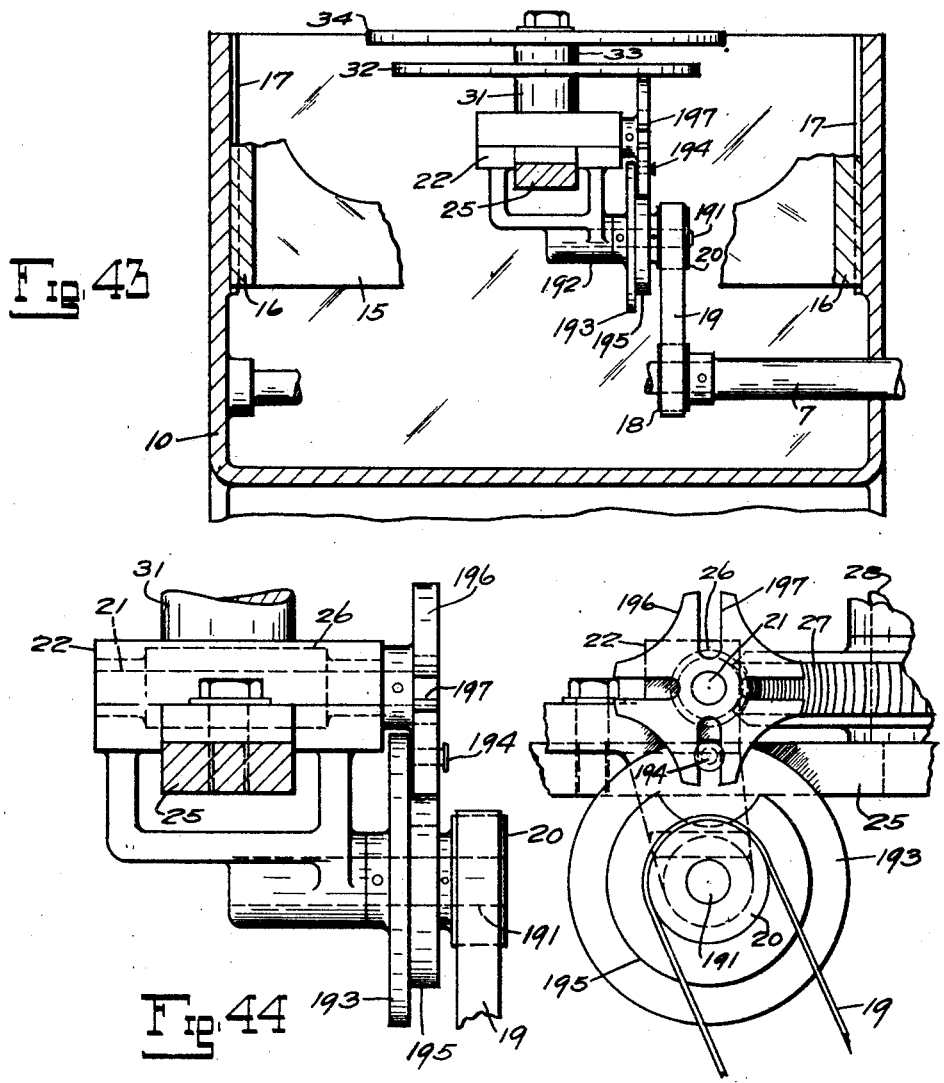

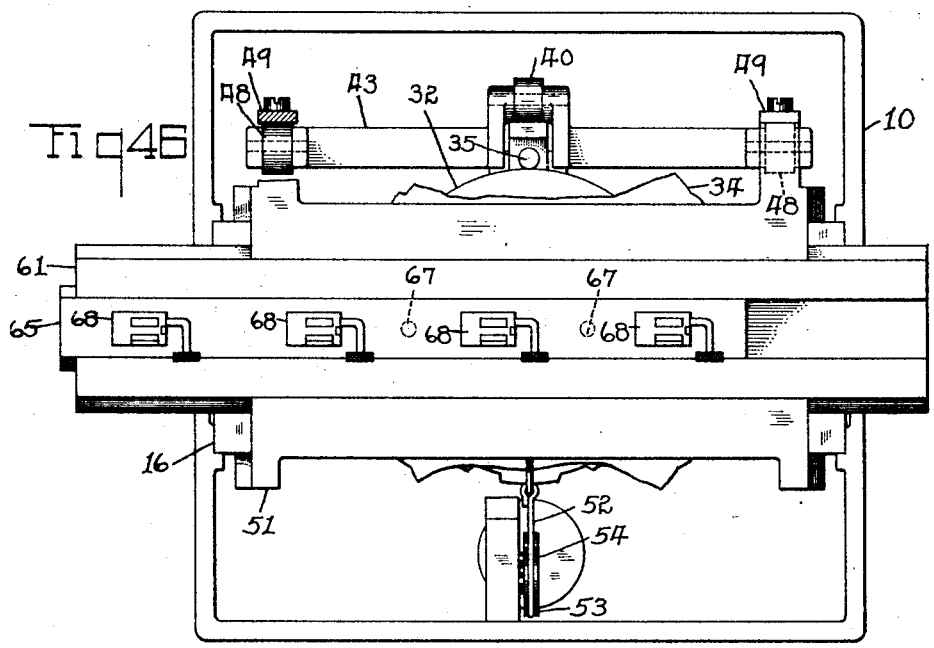
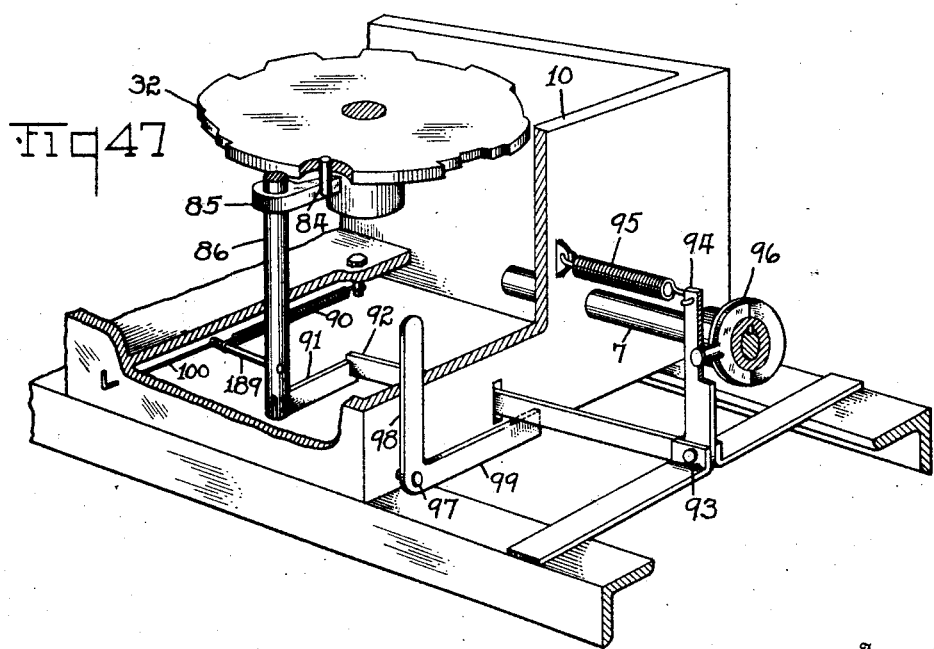

Patented Nov. 6, 1928.

1,690,420

UNITED STATES PATENT OFFICE.

JOSEPH W. MICHAELIS, OF TOLEDO, OHIO.

BRUSH-MAKING MACHINE.

Application filed December 22, 1922. Serial No. 608,429.

This invention has utility when incorporated in machines for the manufacture of brushes. The brush backs are mounted in clamps on the sectional top of the work table and are to be first drilled and then supplied with bristles anchored in the drilled seats. Herein the tools embodying the drills and inserters or tuft-setters are placed in a line above the work table. All drills may operate continuously. The inserter or tuft-setting tools are operated in synchronism for acting upon the work in intermissions between the movements of the work shifted as to the main work table. The work table is lifted toward the tools. This work table is also provided with sections which may be shifted as to the main table. Pattern devices for shifting these sections serve to position the work under the tools. A single source of power is provided, which may be cut in manually, and manually or automatically cut out. When cut out automatically, it occurs after the completion of the drilling of a full set of seats in the brush backs by the drills and after the simultaneous filling of a similar number of seats in a similar number of brush backs by the inserters. The bristles may be supplied to the machine in auxiliary containers or cartridges.

Referring to the drawings:—

Fig. 1 is a side elevation, with parts broken away, of an embodiment of the invention for simultaneously completing brushes in pairs;

Fig. 2 is a fragmentary section on the line II—II, Fig. 1;

Fig. 3 is an end elevation from the right of Fig. 1;

Fig. 7 is a fragmentary section on an enlarged scale on the line VII—VII, Fig. 4;

Fig. 8 is a plan view of a portion of the table of Fig. 7, parts being broken away, and showing actuating and control features therefor;

Fig. 14 is a front elevation of a pair of tools over the table, parts being broken away; the said tools being shown in position as to the work and being the left hand pair of tools as shown in Fig. 1;

Fig. 15 is a fragmentary section on the line XV—XV Fig. 14, showing the agitator for assisting the delivery of bristles from the bristle magazine or hopper;

Fig. 16 is a section on the line XVI—XVI, Fig. 15;

Fig. 17 is a section on an enlarged scale, of the bristle folding and delivering tool, on the line XVII—XVII, Fig. 14;

Fig. 18 is a plan view of a bristle supplying magazine or auxiliary container to be inserted in the bristle supply hopper;

Fig. 19 is a side elevation of the magazine of Fig. 18;

Fig. 20 is a section on the line XX—XX, Fig. 19, showing the bristle release device for the magazine;

Fig. 21 is a perspective view of the gatherer for removing bristles from the hopper;

Fig. 22 is a fragmentary view of the hopper and gatherer approximating its limit position of withdrawal from the hopper, parts being shown in section;

Fig. 23 is a view of that portion of the delivery tube to the left in Fig. 17;

Fig. 24 is a detail view of that portion of the delivery tube to the right in Fig. 17;

Fig. 25 is a detail view in perspective of one of the plunger guides disposed in one of the delivery tubes in the region of the tapered folder portion;

Fig. 26 is a perspective view of the wire guide and stiffener for directing the flat wire into the die to be formed into anchors for holding the bristle in the seats in the brush backs;

Fig. 27 is a section on the line XXVII—XXVII Fig. 14, looking to the right in the direction of the arrow;

Fig. 28 is a fragmentary plan view, on an enlarged scale, of features of the wire feed device of the inserter or tuft-setting tool as seen looking downward from the line XXVIII—XXVIII, Fig. 27;

Fig. 29 is a section on an enlarged scale on the line XXIX—XXIX, Fig. 28;

Fig. 36 is a diagrammatic view of a group of work clamps, the pair of clamps under the inserters carrying drilled brush backs while the pair of clamps under the drills carry brush back blanks, as a first stage of operation;

Fig. 37 is a diagrammatic view showing the second or next stage of operation from Fig. 36, wherein the blanks are being drilled and the drilled brush backs are having bristles anchored thereinto;

Fig. 38 is a diagrammatic view similar to Fig. 37, but with the table moved downward away from the tools, drilling operations having been completed as to the blanks while the brushes have been completed under the inserters; and at this position of the table, operations may stop for the removal of the brushes and an insertion of the brush back blanks in lieu of the completed brushes;

Fig. 39 is a diagrammatic view of the next position, the work clamp table section being shifted to the right from the position in Fig. 38 to bring the pair of drilled backs under the pair of inserter tools and to bring the pair of newly supplied back blanks under the drills;

Fig. 40 is a diagrammatic view showing the next stage of operation from Fig. 39, wherein the newly supplied blanks are drilled and the drilled backs are supplied with bristles by the inserters;

Fig. 41 is a diagrammatic view showing the stage of operation after Fig. 40, wherein the pair of brushes under the inserters is completed and may be removed as such clamps are supplied with brush back blanks;

Fig. 42 is a diagrammatic view showing the next stage of operation from Fig. 41 wherein the table section is shifted to the left thereby bringing the clamps with the work to the position as shown by Fig. 36 for a repetition of the cycle of operation;

Fig. 43 is a view similar to Fig. 4 with additional parts broken away, showing a different type of transmission connection from the main drive shaft to the pattern driving worm shaft to permit in a small range a pattern having more working positions;

Fig. 44 is an enlarged view of the star wheel drive of this transmission connection of Fig. 43; and Fig. 45 is a view of this drive from the right of Fig. 44.

Fig. 46 illustrates a top view of the slides that form the work table. Fig. 47 is a perspective view of the clutch controlling mechanism for automatically and manually stopping the machine.

Figure 4:
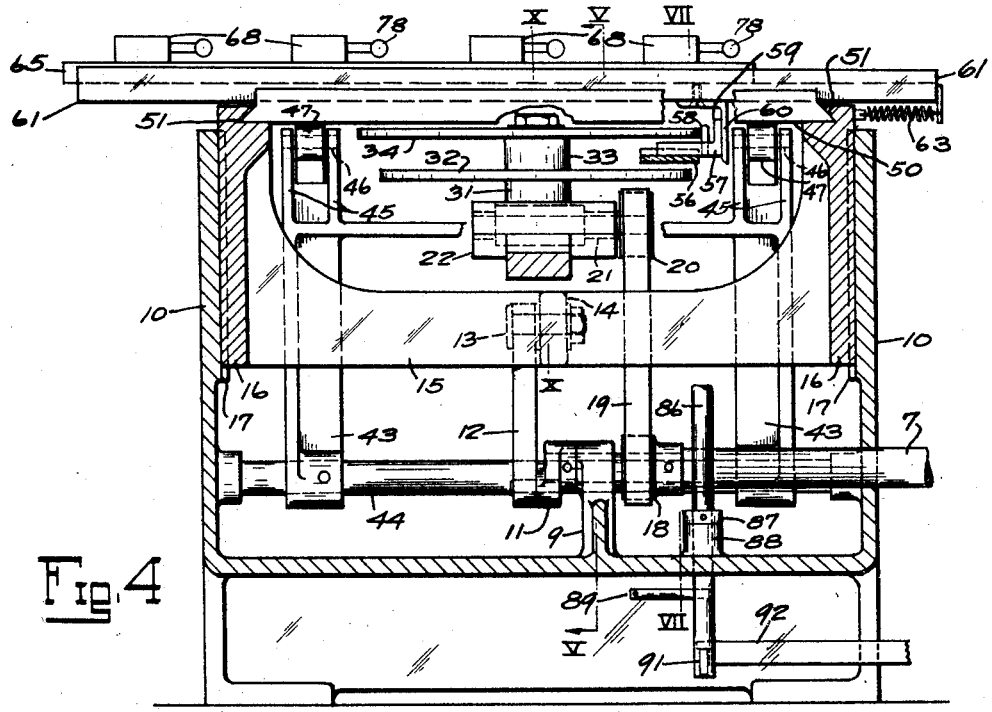
Fig. 4 is a partial section on the line IV—IV of Fig. 3.

A main table or work-holding frame 1 is provided upon which is mounted a motor 2, having a shaft 3 carrying a pinion 4 in mesh with a main drive gear 5 loosely mounted by sleeve 6 on main drive shaft 7, carried by bearings 8, 9, fixed with the main frame 1.

Main table lifting.

This shaft 7 extends into a housing 10, and there terminates in a crank 11, from which upwardly extends a conecting rod 12, (Figs. 4, 5, 6) to pin 13 mounted in cross bar 14 between side bars 15, of a main table work-holding frame. Between these side bars 15 are end plates 16 snugly fitting in guide ways 17 of the housing 10. Accordingly as the shaft 7 rotates, the main work-holding table 14, 15, 16, is moved up and down as to the housing 10, and is rigidly held by this housing in such movement against any end wobbling or side play.

Pattern device drive.

Figure 10:
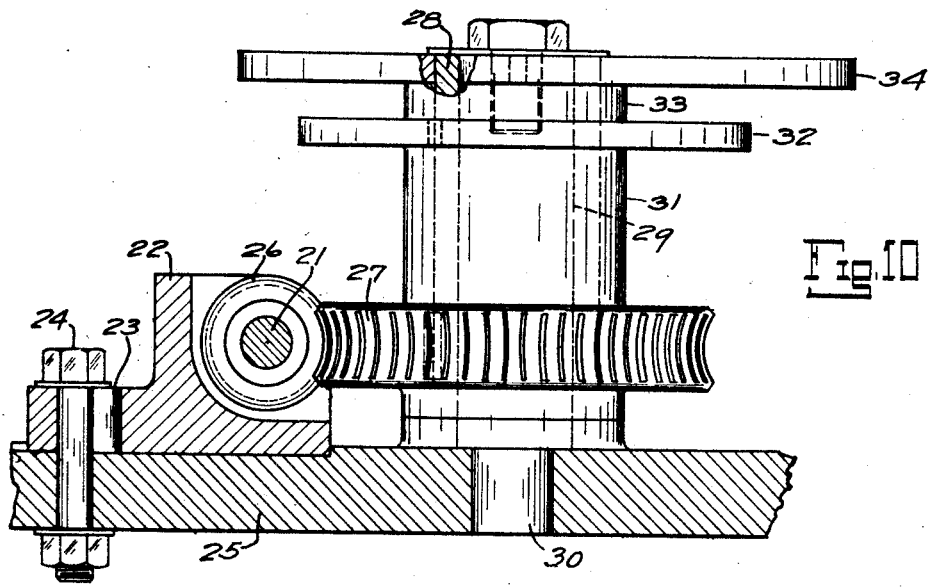
Fig. 10 is a partial section on the line X—X Fig. 4, on an enlarged scale showing the drive for the pattern cams.
Figure 11:
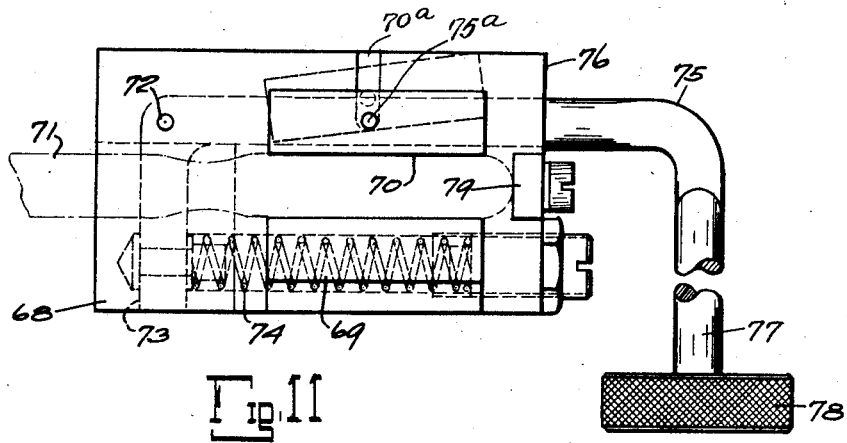
Fig. 11 is an enlarged detail view in plan of a brush back clamp for mounting on the table.
Figure 12:
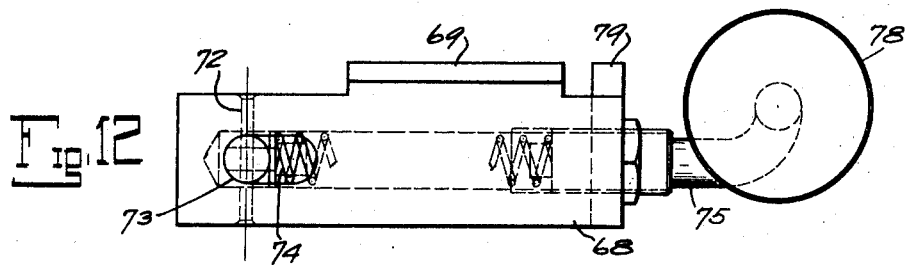
Fig. 12 is a side elevation, with parts broken away, of the clamp of Fig. 11.
Figure 13:
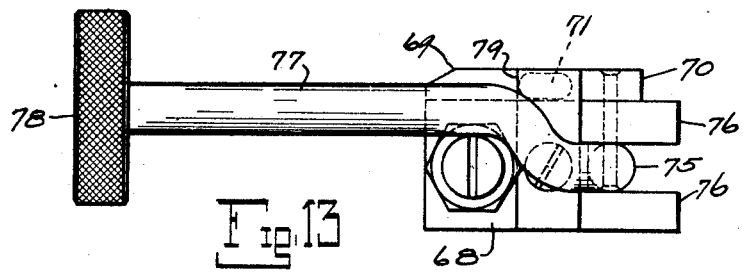
Fig. 13 is an end view of the brush back clamp of Fig. 12.

Mounted on the shaft 7 in the housing 10 is sprocket wheel 18 (Figs. 4, 7) about which passes sprocket chain 19, to sprocket 20 on shaft 21, extending into housing 22 (Fig. 10) provided with a slot 23. Bolt 24 in this slot 23 may thus serve to permit adjustable mounting of this housing 22 and shaft 21, as to cross bar 25 carried by the housing 10. This shaft 21 has fixed thereon worm 26 in mesh with worm wheel 27 on sleeve 28. This sleeve 28 is positioned as to the bar 25 by stem 29, having reduced portion 30, fixed in the cross bar 25.

There is assembled on this sleeve 28 above the worm wheel 27, sleeve 31 spacing cam 32 from this worm wheel 27. A second sleeve 33 spaces cam 34 from the cam 32. These cams 32, 34, are pattern devices connected to rotate with the sleeve 28.

Transversely shiftable table section.

The second table section, or that which rests directly on the main table section 14, 15, 16, is transversely shiftable, that is, shiftable transversely as to the shaft 7. This operation is brought about by action of the pattern wheel 32, having its cam periphery act against pin 35, in slide 36 (Fig. 7), mounted in bracket 37 upstanding from cross bar 25 carried by the frame 10. This slide 36 has upstanding end 38 to bear against flat side 39 of rocker bearing 40 mounted on pin 41 carried by brackets 42 upstanding centrally from a rock frame having arms 43 extending to rock shaft 44 mounted in the housing 10. This rocking frame 43 has upstanding forks 45 (Fig. 4) near each end thereof. In each of these forks 45 is mounted a pin 46 carrying a rocker bearing 47 having a flat side 48 to engage downwardly extending or depending finger 49 from lower transversely shiftable table section 50 mounted in guideways 51 of the main table section, having the cross portions 16.

Accordingly it is seen that notwithstanding the link 12 may effect upward movement of this lower or transversely shiftable table section 50, such section may have an additional movement, that is, horizontally as well as the vertical movements from the link 12, due to the action of the pin 35 as shifted by the cam 32 as a pattern device, thereby acting through the depending finger 49 to shift the table. The movement of the table 50 away from the cam 32 does not modify this action because the fingers 49 are long enough to be acted upon by the rocker bearings having the flat faces 48 during this relative travel. The pin 35 is moved by the pattern cam 32 against the weight 55 and slides the slide 36 or permits the slide 36 to move in the opposite direction by the action of the weight 55. The slide 36 operates through the upstanding end 38, which acts on the rocker bearing 40 mounted on the rocker frame 43 and causes it to move outward or permits it to move inward by the action of the weight 55 to which it is connected through slide 50, the finger 49 and the self adjusting rocker bearings 47 which are attached to the sides of the rocker frame 43. This is particularly shown in Fig. 46.

This lower table section 50 is held against the cam 32 by a cable 52 passing about idlers 53, 54, mounted in the housing 10 and extending downward to a counterweight 55.

*Longitudinally shiftable table section.*

Figures 5, 6:
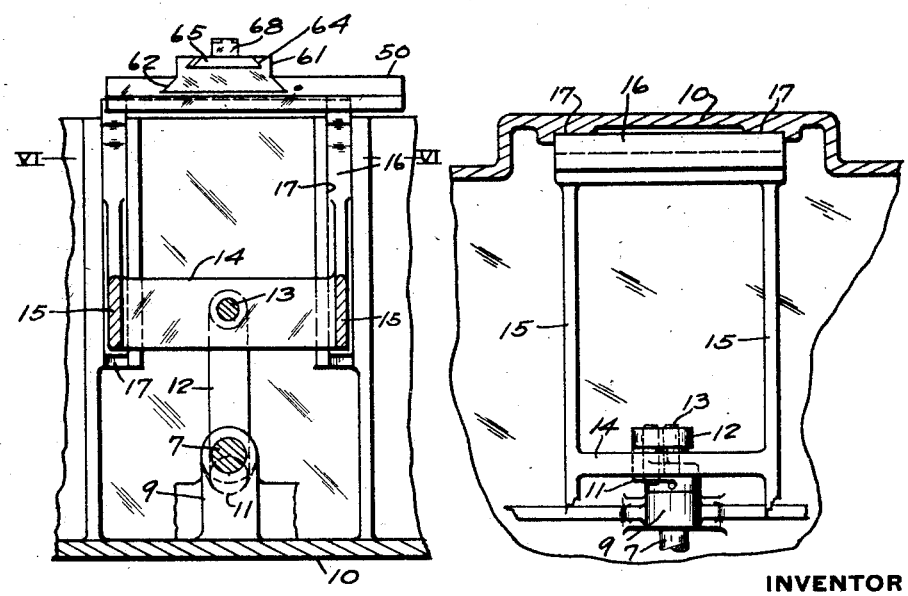
Fig. 5 is a partial section on the line V—V, Fig. 4.
Fig. 6 is a partial section on the line VI—VI, Fig. 5.
Figure 9:
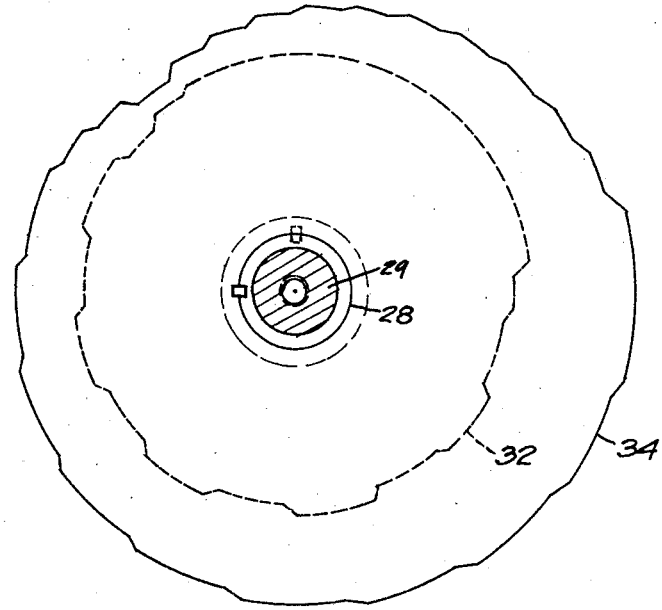
Fig. 9 is a plan view of the pattern devices or controlling cams looking downward from the line IX—IX Fig. 7.

Carried by this transversely shiftable table section 50 is an additional relatively adjustable table section (Fig. 4). Below the cam 34 transverse bracket portion 56 is fixed with the housing 10 and provides a guide for slide 57 having pin 58 therein to be acted upon by this cam 34 as the radii thereof change. This slide 57 has upstanding shoe or face 59 to engage depending face or shoe 60 fast with table section 61 slidable in guideways 62 of the adjustable table section 50 (Fig. 7). This second or transversely shiftable table section 61 is normally urged against the action of the pin 58 by spring 63 which accordingly takes up lost motion between the shoes or faces 59 and 60 as well as between the pin 58 and the cam 34. This tension helical spring 63 is connected between the main table section 16 and this second section 61.

The action or shifting movement of these table sections 16, 50 and 61 is automatic. That is, each one is operable by the machine and the section 50 is shiftable as to the section 16 to carry the section 61 with this section 50, while this section 61 is shiftable as to the section 50 to carry such section as to the other two sections.

*Work placing.*

This third automatically shifted table section 61 is provided longitudinally thereof with a guide 64 for fourth relatively shiftable table section 65. As herein shown this section 65 is shifted to two positions, and is held in such positions by the spring detents 66 and 67. The operator may effect this shifting of the table section 65 to the two definite positions between the supplies of work to the table as such work may be provided to the work holders.

Mounted on the table section 65 is a series of blocks 68.

Fixed to each of these blocks 68 is a flange upstanding section 69 opposed by a relatively movable section 70. This section 70 is movable as to the block 68.

As the shoulder section 70 is swung toward the section 69 it serves to effect gripping between such shoulder sections of a blank or brush back 71 mounted on this block 68 so it may be held in a definite fixed position against shifting as to this block 68. In this block 68 is pivot pin 72 for a lever having arm 73 normally thrust into seating position by helical spring 74. This lever, having the arm 73 has a second arm 75 which when thrust into closed position as to the block 70 carried by the arm 75 moves into fork 76 of this block 68.

This controlling lever 73, 75 beyond its arm 75 has an extension 77 to a handle 78 which the operator may thrust in effecting release of a drilled blank 71 or a finished brush. The operator may at a single thrust operation not only release a finished brush but insert a blank therein, said blank being shoved up against stop 79 and then upon release of the handle 78 the spring 74 will automatically effect the resetting of this new blank into the desired position for a repetition of the operations in forming a brush therefrom.

*Drilling.*

The main frame 1 has upstanding ends to carry over the table a transverse section or frame 80. This frame 80 has mounted thereon motors 81 having transmissions 82 for driving drills 83 at high speed. These drills 83 extend downwardly toward the work table. The spring detent 66 serves to hold the table section 65 into such position that the left terminal clamp is in position under the left terminal drill. Accordingly in the operation of the main table section 16 in thrusting the whole table upward, this clamp in carrying a brush back blank 71 is brought into position as to the drill 83, and on each upward shift of the main table section 16 has the drill 83 make a hole or seat in such brush back 71. Between this uplifting travel of the main section 16 the one or the other of the cams 32, 34 may be effective to shift the table section 50 or 61 so that the brush back blank 71 is shifted around and the seats are distributed by the drill 83 in a symmetrical manner in the brush back blank.

*Automatic stop.*

When the pattern wheels or cam 32, 34, have completed their cycle of operations in providing the determined number and placing of seats in the brush back blanks, the cam 32 has made one complete rotation and pin 84 depending therefrom strikes arm 85 (Figs. 7, 8) on vertically extending rock shaft 86. This rock shaft 86 (Figs. 4, 7, 8) is provided with collar 87 vertically positioning this rock shaft 86. This rock shaft 86 has bearing 88 below this collar 87 (Fig. 4) mounting this rock shaft 86 in the frame 10. This rock shaft 86 has fixed therewith arm 89 extending to tension helical spring 90 normally pulling this rock shaft 86 so that the arm 85 is in the path of the pin 84. Also fixed with this rock shaft 86 is arm 91. In this slight arc movement of this rock shaft 86 as effected by the pin 84, this arm 91 is pulled from beneath arm 92 of bell crank lever having fulcrum 93 and upstanding arm 94 normally actuated by helical tension spring 95 to release the clutch 96 from driving connection to the shaft 7 (Figs. 1, 2).

There is accordingly effected an automatic stopping of the table movement. However, the drills 83 continue their rotation.

The table section 65 may now be shifted to have the spring detent 67 operative in holding the work in a second position. The operations of the table for the automatic shifting may be repeated. To this end there is mounted on the housing 10 a pivot pin 97 for angle lever having an upstanding arm 98 (Fig. 2), which may be pulled to have its other arm 99 lift the angle lever 92 so that the arm 91 will reengage therewith and hold the clutch 94 in driving position. This arm 91 will reengage therewith directly because the travel of the cam face 32 has been to clear the pin 84 so that the spring 90 will effect resetting of this rock shaft 86.

In case of emergency when it is desired to stop the shiftings of the table section intermediately of the pattern forming of the drill seats or the insertion of the different gathers of bristles such may be effected by pulling chain or cable 100 thereby acting in the same manner as though pin 84 were effective for rocking the rock shaft 86. This manually effected rocking of the rock shaft 86 operates through the bell crank lever 92, 93, in the same manner for releasing the clutch 96.

The brush making machine may both drill and fill the holes in the brush backs, one or more brush backs being drilled and an equal number of brush backs which have been previously drilled being filled at the same time.

Effective means is provided for directing and controlling the movements of one or more brush back carrying parts as the drilling and filling operations progress, whereby the positioning of the holes or the placing of the bristle tufts therein is accurately and positively controlled.

Indexing for shifting the brush back clamps between the drilling mechanism and the filling mechanism permits the brush backs to be alternately bored on different sides of a filler, the drilling mechanisms and the filling mechanisms being alternately and equidistant spaced on the machine and the brush back clamps being equidistant spaced on a movable slide. The brush backs are held so that they may be quickly put on or taken off the machine. There is accurate alignment of the brush back carrying parts in parallel with the drilling and the filling mechanisms. Intermittent driving of the cams controls the brush back movements, and locks them during the drilling and the filling operations. These cams provide for fixing the relation between the driving member and the number of holes in the brush.

*Bristle supply.*

Between the drills, the frame 80 may carry a pair of guides 101. These guides 101 may serve as a portion of a bristle supply hopper. However, as herein disclosed there is special advantage in supplying the bristles to this hopper section in a removable magazine or cartridge. To this end there is provided a container 102 having a removable staple or bottom portion 103. This bristle cartridge or container 102 is shown as having in its upper portion a transverse slot 104 with a central enlargement 105. Into this central enlargement 105 may be inserted a plunger pin 106 having a cross head 107 thereon for entering the top slot portion 104. Weight 108 on the pin 106 is thus effective to depress or hold downward in this cartridge 102 the bristles and feed the bristles down into the narrowing or tapered lower portion 109 of the delivery portion of this hopper.

Bristle agitator.

In its lower extremity one of the guides 101 is provided with a pivot pin 110 for section 111 carrying a roller 112 (Fig. 16). A cam 113 is operable in reciprocation to ride under roller 112 and thereby, in lifting this roller 112, lifts this section 111 on its bearing 110 as an axis and through such lifting effects a jostling or agitation of the bristles in the lower part of the hopper so that these bristles may freely fall in uniform quantities into notch 114 reciprocable or slidable along guide 115 under the hopper (Figs. 14–22, inc.).

FILLER UNIT.

Bristle stripping.

As the notch 114 moves into position under the narrowed opening of the hopper, the bristle charge falls into this notch 114 in a rib 116 which as extending each way from this notch limits the volume of discharge. This rib 116 is fast with main slide section 117 having the cam 113. In this travel of these members 116, 117, from beneath the hopper, the bristles are held from rising out of the notch 114 by guide 118, while the volume of the bristles or the holding up from the bottom of the notch is effected by opposing guide 119. There is accordingly provided between these guides 118, 119, a travel slit 120, transversely through which these bristles as held by the notch 114 pass in the reciprocation of the structure 116, 117 (Figs. 16, 22, 24, 31).

Bristle feeding drive.

Mounted on the shaft 7 (Figs. 1, 3, 14) is a sprocket wheel 121 about which extends sprocket chain 122 upwardly to pass about sprocket wheel 123 on shaft 124 extending into the transverse top frame 80. On this shaft 124 (Fig. 27) there is a clutch 125 which, in emergency, may be operated by handle 126. However, this clutch is normally in position to connect to the shaft 124 with shaft 127 upon which is mounted a pinion 128 in mesh with intermediate idle pinion 129 having engagement with pinion 130. This pinion 130 is in engagement with pinion 131 for effecting rotation of cam 132 (Fig. 14). This cam 132 has a peripheral groove with which engages pin 133 effective in the rotation of the cam 132 for rocking lever 134 against the resistance of spring 134'. This lever 134 has link connection 135 with reciprocable member or structure 116, 117, for pulling the notch 114 from beneath the hopper 101. Register of the notch 114 with the bristle plunger 190 is adjusted by set screw 117' serving as a stop for the reciprocable structure 116, 117, in its withdrawn position with a gather of bristles.

Anchor wire feeding.

From remote spools or sources of supply, flat wire 136 may extend through guide 137 (Fig. 14) as carried by bristle hopper carrier frame 138. In this frame 138 carrying the gear 130 is pinion 139 driven from this gear 130. This pinion 139 is on shaft 140 (Fig. 28) which is effective to drive disc 141 (Fig. 29) carrying pin 142. This disc 141 has a plate 143 thereon to ride into seating or holding relation with concave portion 144 of star wheel 145 when the pin 142 is not engaging a notch in the star wheel. This star wheel 145 is accordingly intermittently operated. This effects step by step rotation of shaft 146. Fixedly mounted upon this shaft 146 is four thread pitch worm 147 in mesh with worm wheel 148. Fast to this worm wheel 148 is friction wire feed wheel 149 and pinion 150. This pinion 150 is in mesh with pinion 151 on stem 152 carrying friction wire feed wheel 153 opposing the wire feed wheel 149. This stem 152 is mounted in bracket 154 having fulcrum bearing 155 in the frame 138. This bracket arm 154 is spring in its structure and the spring holding of the friction wheel 153 against the friction wheel 149 is adjusted by screw 156 and the feeding of flat wire 136 therebetween is accordingly determined as a step by step supply through guide or stiffener 154' to the dies.

Inserter tube.

The withdrawal of bristles from the hopper is to position under an inserter tube. This inserter tube is herein shown as comprising a section 157 (Figs. 17, 23), having a bevel guide portion 158 for allowing folding of the bristles at one end. This tube section 157 terminates therebelow in a nozzle portion 158'. This nozzle portion 158' also has a tapered portion 159 to permit folding of the bristles as there is forcing of the central portion of the bristles downward through the nozzle. Opposing this inserter tube section 157 is a second inserter tube section 160 (Fig. 24). This section 160 has a fold up guide portion 161 cooperating with the other ends of the bristles from the guide portion 158 of the inserter tube section 157. Opposing the nozzle section 158 this inserter tube section 160 has a nozzle section 162 provided with a tapered way 163 opposing the tapered way 159 of the inserter tube section 157. The inserter tube has in the respective sections 157, 160, complementary guide portions 164, 165, downwardly extending to opposing nozzle lining guide portions 166, 167 (Figs. 24, 25). These guide portions 166, 167, as removable have opposing guideways 168, therein as a guide for the anchor as forcing downward therebelow the gather of bristles coming into this inserter tube by the way 120, as so drawn by the notch 114.

Anchor forming.

Figure 30:
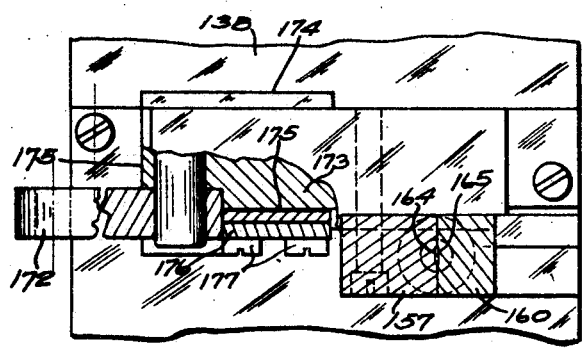
Fig. 30 is a partial section on the line XXX—XXX, Fig. 17.
Figure 33:
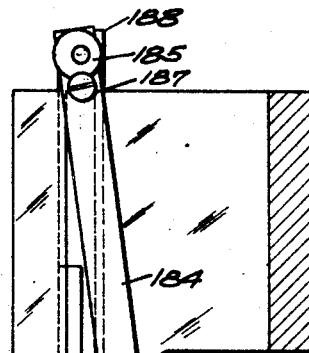
Fig. 33 is a section on the line XXXIII—XXXIII, Fig. 14, looking to the left in the direction of the arrow, showing the plunger drive.
Figure 31:
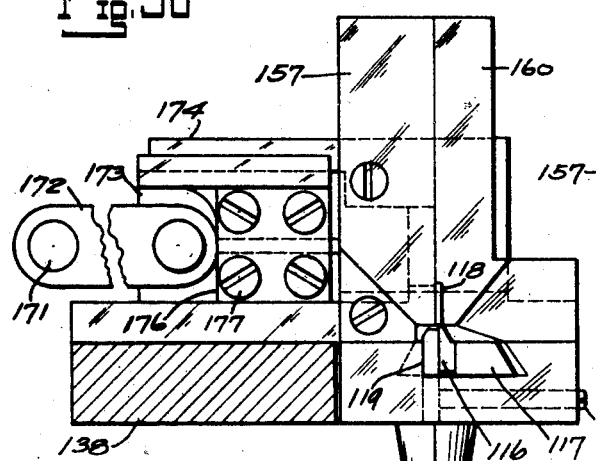
Fig. 31 is a fragmentary side elevation of the anchor forming device of Fig. 30.
Figure 32:
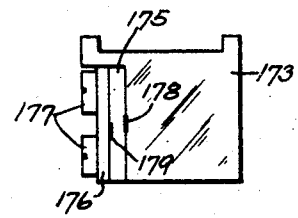
Fig. 32 is an end elevation of the dies and carriers therefor for forming the anchor.

The forming of the anchor is by first slitting and then severing very short sections of the flat wire 136 and supplying such wire into the inserter tube. To this end, there is a drive from the pinion 139, (Fig. 28) in mesh with gear 169. This gear 169 is mounted on shaft 170 having an eccentrically disposed wrist pin or crank 171 connected to link 172 extending to slide block 173 (Figs. 30, 31, 33). This slide block 173 is mounted in guide 174. This slide 173 has fixed therewith plates 175, 176, as anchored in position thereon by screws 177. These plates carry die stems 178, 179, which simultaneously move forward one to notch and the other to sever a notched section of the flat wire 136. At each step in feeding this flat wire this anchor from the dies is fed past said dies into way 180 (Fig. 24) as the anchor thereahead enters the way 164, 165. Accordingly there is between the dies and the inserter tube way 165 an additional anchor or a formed anchor in reserve beyond that which is driven down for supplying the bristles into a brush being formed.

Plunger drive for inserting bristles and anchors.

Figures 34, 35:
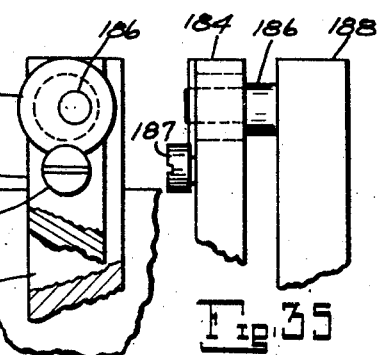
Fig. 34 is a fragmentary detail view on an enlarged scale of the stroke range adjusting device for the plunger as to the connecting rod in Fig. 33.
Fig. 35 is a side elevation of the adjusting device of Fig. 34.

With a bundle of bristles brought from the hopper into the region of the inserter tube and a finished anchor also disposed in such tube, the anchor is thrust down against the bristles and in this travel carries the bristles therewith and forces the bristles into a seat in a brush back and the anchor as so driven forces the anchor to spread at its notch portion in said brush back to anchor therewith and hold the bristles in position. To this end the gear 131 and cam 132 as mounted on shaft 181 (Figs. 14, 33) have anchored therewith a crank 182. This crank 182 carries wrist pin 183 from which upwardly extends connecting rod 184. This connecting rod 184 has in its remote end a pin 185 provided with an eccentric bearing portion 186. This pin 185 is angularly adjustable in the connecting rod 184 and held in position of such angular adjustment by set screw 187, (Figs. 34, 35).

This adjustable pin 186 is in engagement with slide block 188 to be reciprocated in guide 189 fixed with the guides 101 of the hopper. This slide 188 in its reciprocation in guide 189 carries blade or plunger 190 extending into the inserter tube. This plunger 188, 190, starts its downward travel from an upper position above the opening 180 whereby the anchors are supplied to the tube 164, 165, and in its movement downward thrusts such anchor at the head of the plunger 190 and engages at the entrance of the slot 120, as intersecting the ways extended of the guides 164, 165, a gather of bristles. This gather of bristles is forced down ahead of the anchor and is folded as permitted by the tapered portions or guideways 159, 163. The anchor in this continuous travel of the blade or plunger 190 moves in the opposing guideways 168 of the nozzle lining portions 166, 167, as urged by the blade or plunger 190 therebehind. In this travel the folding or doubling of the bristles onto each other is completed and as so folded with the anchor midway therebetween the anchor is thrust into a seat in a brush back 71, and, as so forced down into the seat, the anchor as intermediately notched is spread to engage the body of the brush back and thereby resist removal of the bristles.

For obtaining a pattern design especially for a complex form within a limited range of operation for cams 32, 34, it may be desirable to insert an intermittent or step by step drive between the shaft 7 and said cams. To this end an intermittent drive device is provided (Figs. 43, 44, 45). The drive from the shaft 7 may be by the sprocket wheel 18 driving sprocket chain 19 to rotate sprocket 20, herein shown as on shaft 191 carried by auxiliary bracket 192 depending from the worm housing 22. On this shaft 191 is wheel 193 carrying pin 194 and plate 195. This plate 195 holds by engaging with concave portions 196 of star wheel 197 for giving an intermittent drive to the shaft 21 carrying the star wheel 197. Fixed to this shaft 21 is the worm 26 giving an intermittent drive, in the rotation of the worm wheel 27, to pattern cams 32, 34. With these periods of rest the insertion and drilling operations may occur at the periods of rest and these periods or positions for the different table sections of course may occur at less angular distances from each other on the discs or cams.

In the general structure as herein disclosed, it is to be noted there is a spring stop permitting very quick removal and placing of work. There is equal distance in spacing the clamps on a movable slide or table section which is indexed as to positions in order that work on these clamps may receive first drilling operations, then insertions of stock. Later after the removal of a finished brush another drilling operation follows with the insertion of bristles in the drilling seats in the brush backs, thereby alternating the operation as occurring at each clamp, although the clamp position is changed. In order to accomplish this alternate operation of drilling and inserting, the clamps are spaced equal distances apart along the table section. Notwithstanding the range of the table in carrying the pieces of work, the shiftings maintain register for the different positions due to the evener arrangement in operating the table section and due to the direct drive connections as to the shiftings maintaining the registry for the different pattern positions. This intermittent drive may be placed as convenient in the transmission system.

By backing out the worm housing 22 from worm 27 as effected by loosening the bolt 24, worm 27 and the cams thereover may be removed and cams of a different pattern placed in position as well as different sized worm 27. Accordingly there is range for different operations on this single machine. These changes may be effected simply and quickly.

By backing off screws 198 (Figs. 22, 31) the plate 119 may be shifted up or down and thereby provide means for adjusting the capacity of the notch 114 and accordingly change the size of the bundle of bristles to be stripped or removed from the hopper.

By taking out bolt 199 the frame 138 (Fig. 27) may be readily removed as a unit from the cross frame 80. This affords ready means for replacement or taking down for temporary repairs of one of the inserter tools and such may occur without general interruption of the machine operation, for these auxiliary tools may be replaced by similar auxiliary devices. In a similar manner bolts 200 may be moved to permit taking down of frame 201 for the drill or seat forming tool and mounting a separate or replaceable drill on the frame member 80 as may be desired for replacement or repair.

The machine of this disclosure is compact, of large output capacity and simply designed for precision in operation, convenience in upkeep, and ready adaptation for wide ranges of use.

The bunches of bristle are fed from a mass into the inserting nozzle. There is control of the amount of bristles fed from said mass timed with the bristle supply. The wire for the anchor is accurately fed into the die, and in cooperative relation, the inserter blade drives the formed anchor over the middle of each bunch of bristle, and into the brush back.

What is claimed and it is desired to secure by Letters Patent is:—

1. In a brush machine, three or more seat producing and material inserting tools in a straight line, the material inserting tools being mounted alternately in relation to the seat producing tools, a movable indexing slide extending parallel to the line of said tools, clamps for brush blanks located on the indexing slide to the number of one less than the combined number of the seat producing and material inserting tools, said indexing slide being adapted to be shifted manually to move said clamps alternately under the seat producing and material inserting tools, and positioning mechanism for moving the indexing slide step-by-step in transverse directions in a plane at right angles to the said tools, and driving means for reciprocatorily moving the indexing slide toward and away from said tools.

2. In a brush machine, a plurality of drilling and tuft setting tools alternately arranged with respect to each other, a table disposed beneath said tools, means for intermittently shifting the table in transverse directions beneath said tools, a member slidably mounted on said table adapted to be shifted along the line of said tools, and a plurality of spaced brush blank receiving clamps on said member.

3. In a brush machine, a plurality of drilling and tuft setting tools alternately arranged with respect to each other, a work table disposed beneath said tools, a series of brush blank clamps carried by said table and arranged beneath said tools, means for shifting the table beneath the tools in transverse directions relative to the tools, means to movably mount the brush blank clamps to shift the work from the drilling to the tuft setting tools in a longitudinal direction relative to all of the tools, and means to shift the table vertically toward and away from said tools whereby each piece of work is alternately drilled and set to form a brush.

4. In a brush machine, a plurality of drilling and tuft setting tools, a work holder beneath said tools, a series of brush blank clamps on said work holder arranged in a straight line beneath said tools, the difference in the numbers of brush blank clamps being one less than the combined numbers of the drilling and tuft setting tools and the difference in the numbers of the tuft setting tools being one less than that of the drilling tools, means to movably mount the brush blank clamps thereby to reciprocate the same in a horizontal plane relative to the tools, and means to vertically reciprocate the work holder and clamps toward and away from the tools whereby each brush blank is alternately drilled and set to form a brush.

5. In a brush machine, a plurality of alternately arranged drilling and filling tools arranged in a row, a work holder beneath said tools, a plurality of clamps on said work holder for holding brush blanks in position to be operated upon by said tools, means for shifting the work holder and clamps in transverse directions relative to the tools, means to vertically reciprocate the work holder and clamps toward and away from said tools, and means to movably mount the clamps on said work holder thereby to reciprocate the same in a horizontal plane beneath the tools to move alternate pieces of work from position for operation upon by said tools of one kind to positions for operation upon by said tools of the other kind to alternately drill and fill each blank to form a brush.

6. In a brush machine, a plurality of alternately arranged drilling and filling tools, a work holder, brush blank clamps on said holder, means for positioning the work holder and clamps in vertical and transverse directions relative to said tools, and means to movably mount the clamps upon said work holder thereby to shift the blanks along the line of tools to alternately drill and fill a plurality of holes in each blank to form a brush.

7. In a brush machine, a plurality of alternately arranged drilling and filling tools, a work holder, a plurality of brush blank clamps on said holder, means for positioning the work holder and clamps in a longitudinal and a transverse direction relative to the tools, means for reciprocatorily moving the work holder and clamps toward and away from the tools, and means to movably mount the clamps upon the work holder thereby to shift the clamps reciprocatorily along the line of tools to alternately drill and fill a plurality of holes in each blank to form a brush.

8. In a brush machine, a plurality of alternately arranged drilling and filling tools, a table disposed beneath said tools, clamps on said table for holding pieces of work in position to be operated upon by said tools, means for positioning the table and clamps for drilling and filling a plurality of holes in each piece of work, and means to movably mount the clamp upon the table thereby to shift alternate pieces of work from positions for operations thereupon by said tools of one kind to positions for operations thereupon by said tools of the other kind to alternately drill and fill the plurality of holes in the pieces of work.

9. In a brush machine, a plurality of drilling and tuft setting tools alternately arranged in a straight line, a shiftably mounted table extending parallel to and beneath the line of said tools, a member slidably mounted on said table, spaced clamps for brush blanks carried by said member, the difference in the numbers of clamps being one less than the combined numbers of the drilling and tuft setting tools and the difference in the numbers of the setting tools being one less than that of the drilling tools, means to intermittently shift the table in transverse directions, means for positioning the slidable member in a longitudinal direction relative to the said tools, and driving means for reciprocatorily moving the table and clamp carrying member towards and away from said tools.

10. In a brush machine, a plurality of alternately arranged drilling and filling tools, a work holder, a plurality of brush blank clamps on said work holder, means to vertically reciprocate the work holder and clamps toward and away from said tools, positioning means carried by said work holder to move the clamps in transverse directions relative to said tools, and means to movably mount the clamps upon the positioning means thereby to shift the clamps from the drilling to the filling tools to alternately drill and fill a brush blank to form a brush.

In witness whereof I affix my signature.

JOSEPH W. MICHAELIS.